UNITED STATES PATENT OFFICE.

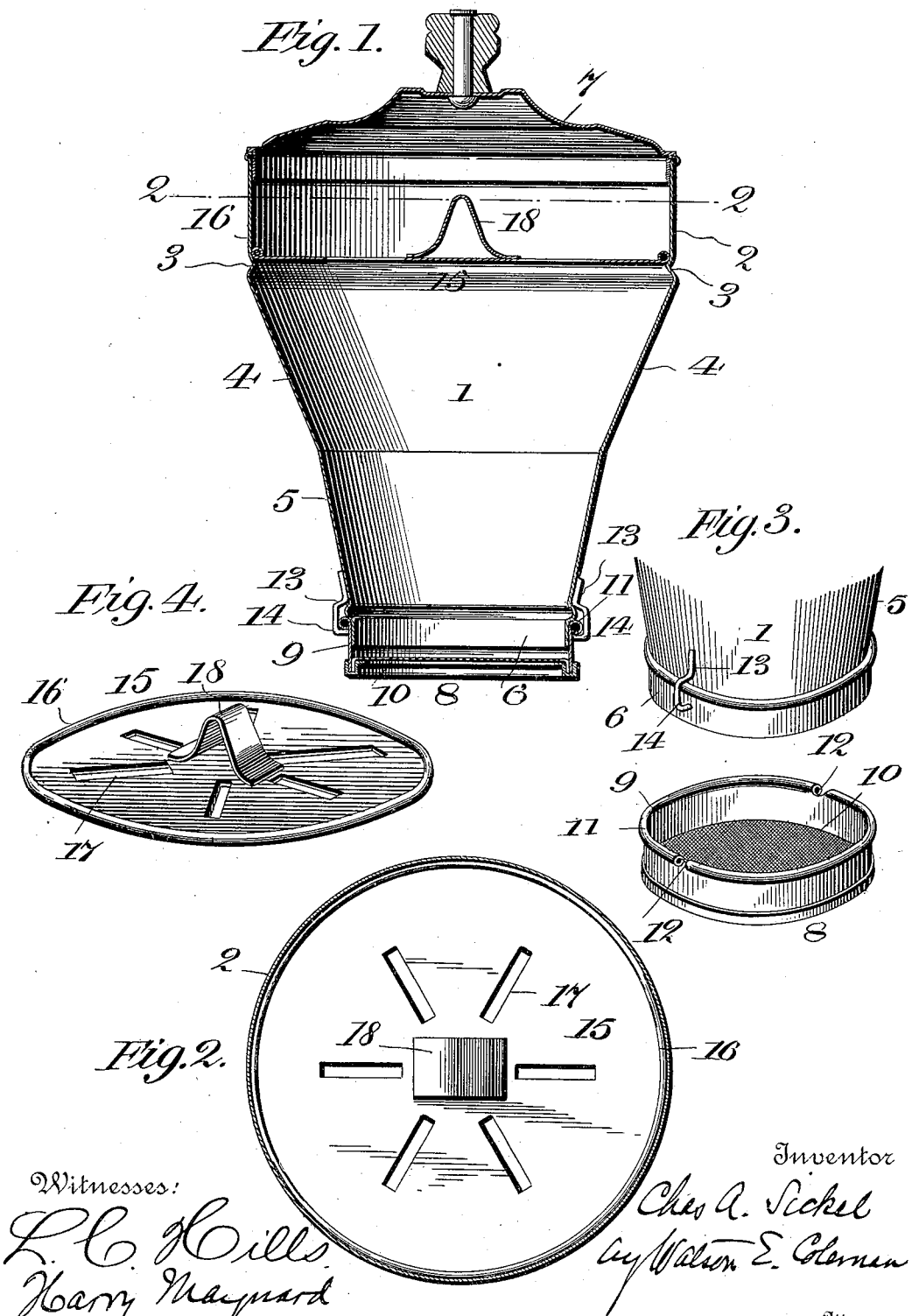

CHARLES A. SICKEL, OF WASHINGTON, DISTRICT OF COLUMBIA, ASSIGNOR OF ONE-HALF TO WATSON E. COLEMAN, OF SAME PLACE.

PERCOLATOR FOR COFFEE-POTS.

SPECIFICATION forming part of Letters Patent No. 656,223, dated August 21, 1900.

Application filed November 28, 1899. Serial No. 738,535. (No model.)

*To all whom it may concern:*

Be it known that I, CHARLES A. SICKEL, a citizen of the United States, and a resident of the city of Washington, in the District of Columbia, have invented certain new and useful Improvements in Percolators for Coffee-Pots, of which the following is a specification.

My invention relates to percolators for coffee-pots, one object of the same being to provide a device of this kind which may be readily applied to ordinary coffee-pots of different sizes and by means of which the pot may be used for making what is known as "drip-coffee."

One of the difficulties that has been met with in the use of drip-coffee pots is that when the hot water is poured onto the mass of pulverized coffee it will plow its way through the center of the mass and pass into the body of the pot without coming into contact with and passing through some part of the coffee-grain.

A further object of my invention is to provide means for preventing this by causing the water to be distributed over all parts of the mass of coffee and to fall gently and in small streams thereon.

A still further object of the invention is to prevent the splashing of the water as it is poured into the percolator and to provide for the removal of the strainer from the lower end thereof to enable the same to be cleaned.

Other objects and advantages of the invention will hereinafter appear, and the novel features thereof will be set forth in the claims.

In the drawings forming part of this specification, Figure 1 is a vertical central sectional view of my improved percolator. Fig. 2 is a horizontal section on the line 2 2 of Fig. 1, showing the water-distributer in place. Fig. 3 is a detail perspective view of the lower end of the body of the percolator and the strainer, the same being slightly separated from each other; and Fig. 4 is a similar view of the water-distributer.

Like reference-numerals indicate like parts in the different views.

The body 1 of the percolator is formed with a cylindrical upper end 2, an internal annular shoulder 3, converging side walls 4 5, and a cylindrical extension 6 upon its lower end.

Fitting upon the upper end 2 is a removable lid or cover 7, of any suitable form and construction, and upon the extension 6 is a removable strainer 8. The said strainer consists of a ring or band 9, having a sheet 10 of fine-mesh wire-netting or the like secured thereto and having a bead 11 around its upper edge, formed with a plurality of slots 12. The lower end of the body 1 has secured to it a purality of hooks 13, which terminate in inwardly-extending engaging portions 14 opposite the cylindrical extension 6. When the parts are in place, the ring 9 embraces the extension 6 and the hooks 13 engage the bead 11 on said ring. In this way the strainer 8 is held against accidental removal from the body 1. To take off said strainer, however, it is merely necessary to turn the same until the slots 12 and the extensions 14 of the hooks 13 are in line with each other, when a direct outward movement will separate said strainer from said body. To reapply the strainer, a reverse operation to that described would be performed.

Located within the cylindrical upper end 2 of the body 1 and supported upon the shoulder 3 is a water-distributer 15, the same being constructed of a disk of sheet metal having a stiffening-bead 16 around its outer edge and provided with a series of elongated radial slots 17. At the center of said disk is secured an inverted-V-shaped strip 18 of sheet metal, the same constituting a handle by which the distributer 15 may be removed from its seat 3 and inserted thereon, and a deflector or spreader for the water as it is poured upon the distributer.

When it is desired to use my improved percolator, the parts are arranged as shown in Fig. 1 of the drawings, pulverized coffee is placed in the space above the strainer 8, and the device is inserted into the upper end of an ordinary coffee-pot. The same is supported by the engagement of the wall 5 or 4 or the shoulder 3 with the upper end of the pot, and as the walls 5 and 4 are both tapering from their upper ends downwardly the device is adapted to fit upon and be used with coffee-pots of varying sizes. When the device is properly seated, as described, hot water is poured upon the central inverted-V- shaped strip 18 on the distributer 15, and by reason of the inclined sides of said strip the stream of water is divided or deflected, and splashing of the same is avoided. Passing from the strip 18 the water flows out upon the upper surface of the distributer 15 and drops gently upon the mass of coffee through the various slots 17. As these slots are arranged at different points around the disk 15, the water is evenly distributed and caused to percolate through all parts of the granulated coffee. The result is that when it drips through the strainer 8 it is thoroughly impregnated with the active ingredient of the coffee-bean and has drawn its strength from all of the coffee that is used. A better beverage is thereby produced and in a more economical manner than heretofore.

Having now described my invention, what I claim as new, and desire to secure by Letters Patent, is—

1. A coffee-percolator comprising a tapering body portion, a cylindrical upper end and an internal shoulder at the junction of said parts; a water-distributer resting upon said shoulder and consisting of a disk having a series of radial slots therein and a central deflector and a removable strainer comprising a ring having a gauze bottom and means for securing the strainer in place upon the body of the percolator, substantially as described.

2. In a coffee-percolator, a tapering body portion, a cylindrical upper end provided with a cover, a shoulder at the junction of said body portion and cylindrical upper end, a water-distributer resting on said shoulder and consisting of a disk having radial slots and a central deflector, and a removable strainer for the bottom of said percolator, said strainer comprising a ring having a wire-gauze bottom, a bead or flange having slots therein, and hooks on the lower end of the percolator to engage said slots, substantially as described.

In testimony whereof I have hereunto set my hand this 21st day of November, 1899.

CHARLES A. SICKEL.

Witnesses:
GEO. E. FRECH,
CHAS. R. WRIGHT, Jr.